(12) United States Patent
Jung et al.

(10) Patent No.: US 8,326,000 B2
(45) Date of Patent: Dec. 4, 2012

(54) APPARATUS AND METHOD FOR DETECTING FACIAL IMAGE

(75) Inventors: Sung Uk Jung, Daejeon (KR); Yun Su Chung, Daejeon (KR); Jang-Hee Yoo, Daejeon (KR); Ki Young Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 793 days.

(21) Appl. No.: 12/484,644

(22) Filed: Jun. 15, 2009

(65) Prior Publication Data

US 2010/0158371 A1 Jun. 24, 2010

(30) Foreign Application Priority Data

Dec. 22, 2008 (KR) .................. 10-2008-0131783

(51) Int. Cl.
*G06K 9/00* (2006.01)
(52) U.S. Cl. .................. 382/118; 382/117
(58) Field of Classification Search .......... 382/117–118, 382/151, 225, 288
See application file for complete search history.

(56) References Cited

U.S. PATENT DOCUMENTS

| 5,642,431 | A | * | 6/1997 | Poggio et al. | 382/118 |
| 6,134,339 | A | * | 10/2000 | Luo | 382/115 |
| 7,428,315 | B2 | | 9/2008 | Rui et al. | |
| 7,716,169 | B2 | | 5/2010 | Park et al. | |
| 7,894,637 | B2 | * | 2/2011 | Noguchi et al. | 382/118 |
| 7,894,640 | B2 | * | 2/2011 | Itou | 382/118 |
| 8,144,945 | B2 | * | 3/2012 | Wang et al. | 382/118 |
| 2003/0198368 | A1 | * | 10/2003 | Kee | 382/118 |
| 2005/0094854 | A1 | | 5/2005 | Kim | |
| 2008/0080744 | A1 | * | 4/2008 | Tanaka | 382/118 |
| 2008/0175447 | A1 | | 7/2008 | Kim et al. | |
| 2008/0273097 | A1 | * | 11/2008 | Nagashima | 348/231.99 |
| 2008/0309772 | A1 | * | 12/2008 | Ikeda | 348/208.7 |

FOREIGN PATENT DOCUMENTS

| KR | 1020050041772 A1 | 5/2005 |
| KR | 1020060074410 | 7/2006 |
| KR | 1020070061347 | 6/2007 |
| KR | 1020080069878 A1 | 7/2008 |
| KR | 1020080101388 | 11/2008 |

OTHER PUBLICATIONS

Kim, et al. "Real-Time Implementation of Face Detection for a Ubiquitous Computing", ICCSA 2005, pp. 1187-1195.*

* cited by examiner

*Primary Examiner* — Daniel Mariam (74) *Attorney, Agent, or Firm* — Nelson Mullins Riley & Scarborough LLP; EuiHoon Lee, Esq.

(57) ABSTRACT

A method of detecting a facial image includes pre-processing an image; and detecting a face region from the pre-processed image to create facial records of the detected face region. Further, the method of detecting the facial image includes detecting the facial image by creating coordinates of the face and eyes in the input image by using the facial records.

18 Claims, 6 Drawing Sheets

APPARATUS AND METHOD FOR DETECTING FACIAL IMAGE

CROSS-REFERENCE TO RELATED APPLICATIONS

The present invention claims priority to, and the benefit of, Korean Patent Application No. 10-2008-0131783, filed on Dec. 22, 2008, which is incorporated herein by reference.

FIELD OF THE INVENTION

The present invention relates to a system for detecting a facial image, and more particularly to facial image detecting apparatus and method.

BACKGROUND OF THE INVENTION

A facial image detecting technology is used in various fields since an adaptive boosting technology has been appeared in the world. The adaptive boosting technology is used in various facial image detecting and searching systems due to detection of a facial image in real time by learning a face in off-line and a high quality facial image detection.

For instance, the adaptive boosting technology is mainly used in products having a facial image detecting function such as CCTV/Digital Video Recorder (DVR), a face recognizing smart camera, a face recognizing mobile phone, a photo-booth, a face recognizing printer and a digital still camera.

Since a method of detecting a facial image requires a number of facial images, a face detection rate does not come in question. However, a post-processing such as face authorization cannot be carried out when facial image detection in a database search or from a single image such as a photograph is failed. And thus, the facial image detection requires high precision. Moreover, a method of detecting a facial image as a result of learning a face in off-line shows a different face detection rate according to whether which learning database is used.

In addition, a method of searching a candidate of a facial image using color information of an image or segmentation of an image is not suitable for detecting a facial image requiring a high face detection rate because the method is dependent on the color information and the color information is influenced by illumination.

Therefore, in a field requiring a high face detection rate like in a single image, there is no time restriction differently from a field of detecting a facial image in real time but a more precise search is required.

SUMMARY OF THE INVENTION

In view of the above, the present invention provides facial image detecting apparatus and method capable of detecting a correct face area and a coordinate of eyes.

In accordance with a first aspect of the present invention, there is provided a method of detecting a facial image, including: pre-processing an input image;
detecting a face region from the pre-processed input image and creating facial records of the detected face region; and detecting the facial image by creating coordinates of the face and eyes in the input image by using the facial records.

In accordance with a second aspect of the present invention, there is provided an apparatus for detecting a face, including: an image input unit for receiving an input image; a pre-processor for performing pre-processing to the input image; a facial record creating unit for creating the n×n pixel-sized windows with respect to the pre-processed image, detecting face regions from the windows and creating facial records with respect to the detected face regions; and a face detector for detecting a face by creating center coordinate of face and coordinates of eyes in the input image by using the facial records.

In the facial image detecting apparatus and method robust to face pose changes for detecting a plurality of facial images, strong face and eye classifiers that are learned with adaptive boosting in off-line are used to perform the facial image detection, the eye detection, the normalization, and the face verification while an input image is reduced by a preset magnification, facial records such as center coordinate, width, and length of faces, and center coordinates of eyes which are created during the face verification are used to perform the facial image detection, so that the facial image can be exactly detected even though various face pose changes. Next, the center coordinates of face and eyes obtained from the facial record are classified into several face candidates and eye candidates by applying clustering, and respective clusters are analyzed to detect final positions of face and eyes.

BRIEF DESCRIPTION OF THE DRAWINGS

The objects and features of the present invention will become apparent from the following description of embodiment in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
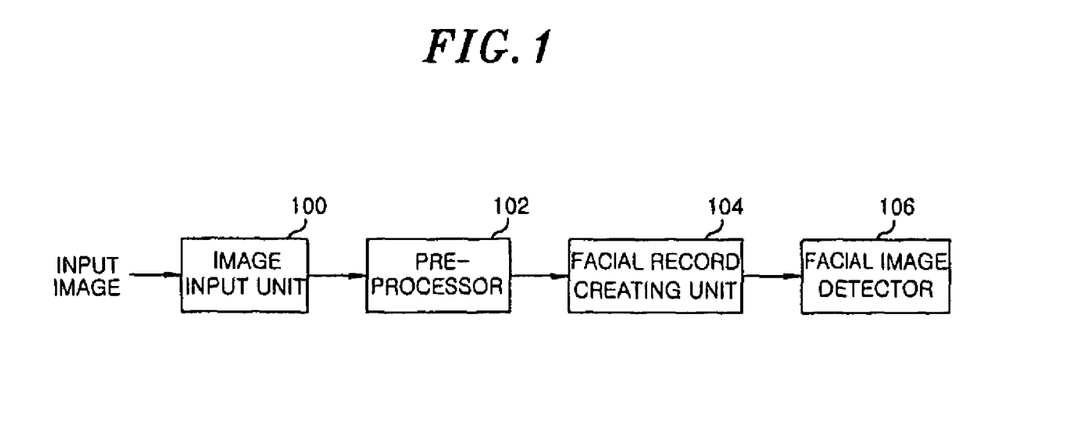
FIG. 1 is a schematic block diagram of a facial image detecting apparatus in accordance with an embodiment of the present invention.

FIG. 1 is a schematic block diagram of a facial image detecting apparatus robust to face pose changes in accordance with an embodiment of the present invention. A facial image detecting apparatus of the present invention includes an image input unit 100, a pre-processor 102, a facial record creating unit 104 and a facial image detector 106.

The image input unit 100 receives an image from which a facial image is to be detected and applies the received image to the pre-processor 102.

The pre-processor 102 converts the image received from the image input unit 100 into a black-and-white image and performs compensation of illumination to the converted black-and-white image through histogram equalization or self quotient image (SQI) process such that illumination effect can be minimized in the detection of facial image.

The facial record creating unit 104 creates n×n sized windows with respect to the compensated black-and-white image, detects a face region by inspecting whether a face is in the respective windows, and detects coordinates of eyes. In addition, the facial record creating unit 104 normalizes facial image into a preset size based on positions of the eyes to create facial records such as a center coordinate of face, coordinates of eyes, a face size and on the like.

The facial image detector 106 classifies the facial records into a face candidate group and an eye candidate group through a clustering technique and calculates the center coordinate of face and the coordinates of eyes by calculating an average coordinate of the face region and the positions of eyes from the face candidate group and the eye candidate group.

Specifically, firstly the facial image detector 106 calculates the average coordinate of the center coordinates of the face candidate group, eliminates facial records far from the average coordinate over a preset distance, and calculates an average coordinate of the center coordinates of remaining face candidates after the elimination to obtain a final center coordinate of face. Moreover, an average coordinate of eye coordinates of the eye candidate group is calculated by using the remaining facial records after eliminating the center coordinates of faces, and eye candidates far from the average coordinate over a preset distance are eliminated, an average coordinate of eye coordinates of the remaining eye candidates is calculated again to calculate a final coordinate of eyes. A size of face is calculated by extracting face size information from the respective facial records of the face candidates used in calculating the final center coordinate and averaging the face size information.

Figure 2:
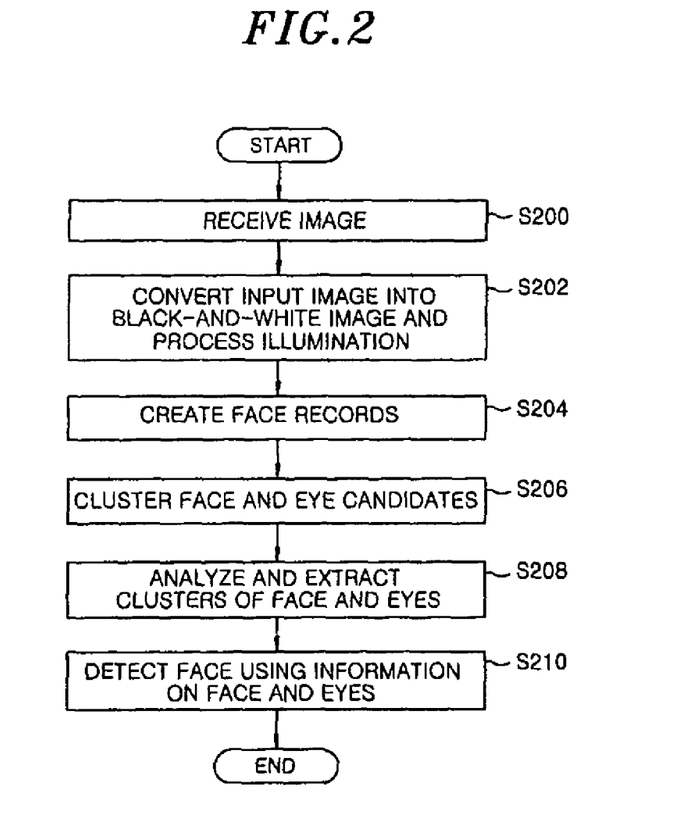
FIG. 2 is a flowchart illustrating in a facial image detecting method in accordance with the embodiment of the present invention.

FIG. 2 shows a flowchart illustrating face detection operations of a plurality of faces, which is robust to face pose changes in the facial image detecting apparatus in accordance with the embodiment of the present invention.

First, when an image from which detection of a facial image is required is input to the image input unit 100 in step S200, the input image is converted into a black-and-white image and compensation of illumination is performed by the pre-processor 102 in step S202. In this case, the compensation of illumination minimizes the illumination effects by using histogram equalization or SQI process.

Thereafter, facial record information is created by the facial record creating unit 104 from the image pre-processed by the pre-processor 102. In other words, the facial record creating unit 104 creates n×n pixel-sized windows from the pre-processed image, performs the face detection, eye detection, normalization and face verification from images in the windows, and creates facial records while reducing magnification of the images in step S204.

As such, the created facial records are used to detect faces by the facial image detector 106. That is, when a plurality of facial records are created, the facial image detector 106 classifies the facial records into the face candidate group and the eye candidate group by using clustering techniques such as Self Organizing Map (SOM) or K-means clustering in step S206.

At this time, when the face candidate group and the eye candidate group are classified as described above, an average coordinate of the respective face candidates is calculated, facial records containing face candidates far from the average coordinate over a preset distance are eliminated, and an average coordinate is calculated again to calculate a final center coordinate of faces. Meanwhile, a final coordinate of eyes is calculated by which an average coordinate of the respective eye candidates is obtained, eye candidates far from the average coordinate over a preset distance are eliminated, and an average coordinate is obtained again to calculate the re-obtained average coordinate as the final coordinate of eyes in step S208.

Next, the face is detected by using the final center coordinate of face and the final coordinates of eyes in step S210.

Figure 3:
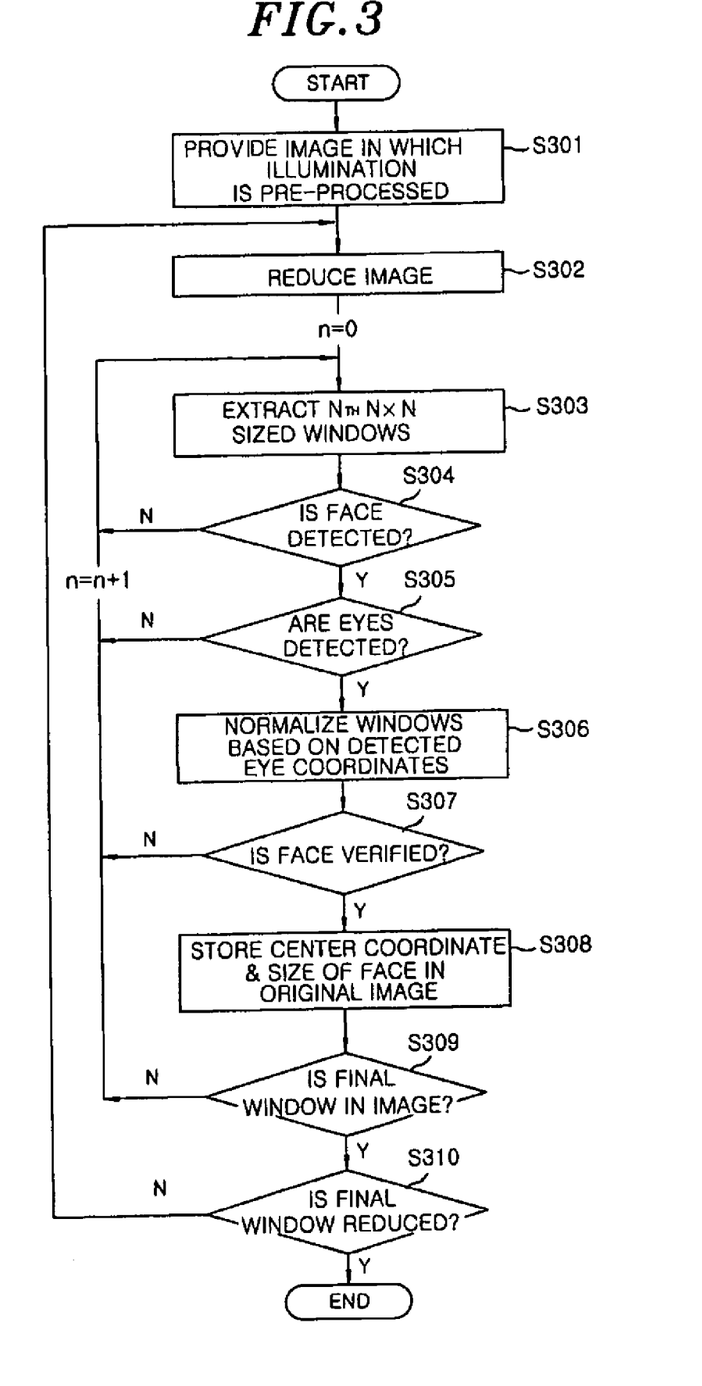
FIG. 3 is a flowchart illustrating a procedure of creating facial records in the facial image detecting method in accordance with the embodiment of the present invention.

FIG. 3 shows a flowchart illustrating a procedure of creating the facial records in the facial record creating unit robust to face pose changes of FIG. 1. When the image in which the illumination is pre-processed is provided to the facial record creating unit 104 as an input image in step S301, the facial record creating unit 104 reduces the image with a preset magnification in step S302. The image is not reduced when the image is a first loop, but is reduced from second loop by a preset magnification.

Then, the facial record creating unit 104 extracts windows of restricted portions (n×n sized pixel) of entire regions from the reduced images (step S303) and inspects whether the images of extracted windows are faces in step S304. The inspection of faces is made by a face strong classifier that is learned by an adaptive boosting algorithm and determining whether the images of extracted windows are faces. When the image of extracted window is not a face, the facial image detection is performed to the next window. When facial image is detected, the eye detection is performed from the detected facial image in step S305.

Then, the facial record creating unit 104 calculates the positions of eyes as the positions of eyes in the input image of which size is not reduced when the positions of eyes are detected, and normalizes the input image by a preset size based on the positions of eyes in the input image in step S306. That is, the image is rotated such that the positions of eyes are on the horizontal line and the image is reduced to a preset size.

Next, the facial record creating unit 104 compensates illumination with respect to the reduced image. In this case, when the image from which a face is detected is normalized, face verification is performed to the normalized image in step S307. The reason why the face verification is performed with respect to the image from which face is detected is because, although a face is detected and eyes are detected in the previous step, another portion other than the facial image may pass the face verification.

Therefore, the face verification is performed to the normalized image. The face verification may be performed by using the strong classifier learned with the adaptive boosting or relative brightness difference of face elements. That is, eyes have lower brightness than a cheek and a mouth has brightness relatively lower than a cheek. The face verification is performed by using these features.

When all procedures as described above are passed, the facial record creating unit 104 stores a coordinate of a center point of a face, width and length of the face, and the coordinates of eyes as a single facial record in step S308. These procedures are continuously performed to a final window of the image in step S309. When the procedures are performed to the final window, a next image is reduced by a preset magnification and the above procedures are repeated in step S310. When passing the above procedures, a plurality of facial records is finally created.

Figure 4A:
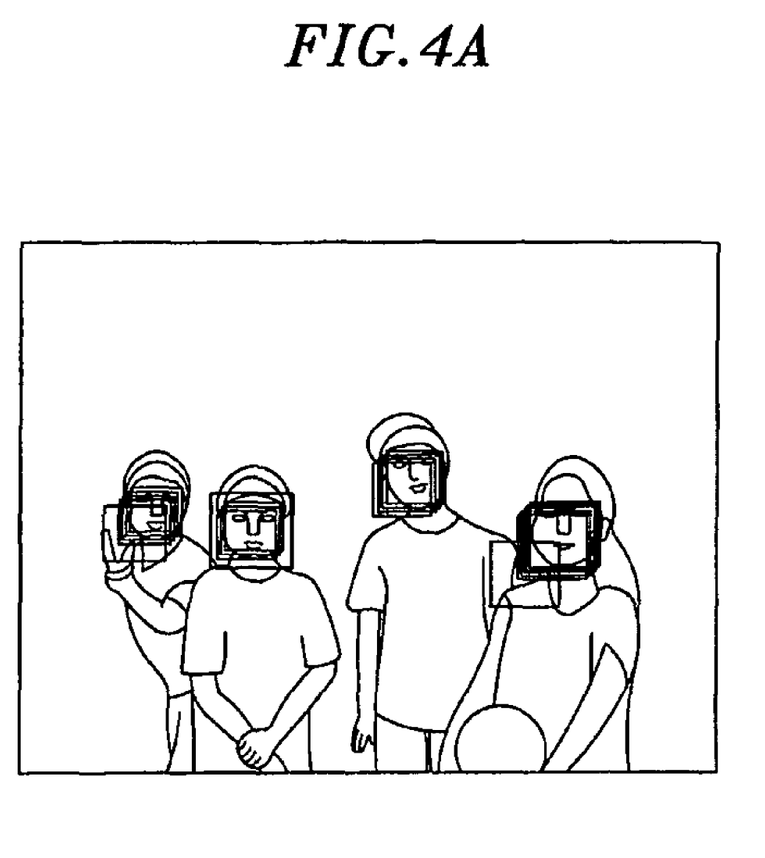
FIGS. 4A through 4E are exemplary views illustrating clustering classification for a facial image detection in accordance with the embodiment of the present invention.
Figure 4B:
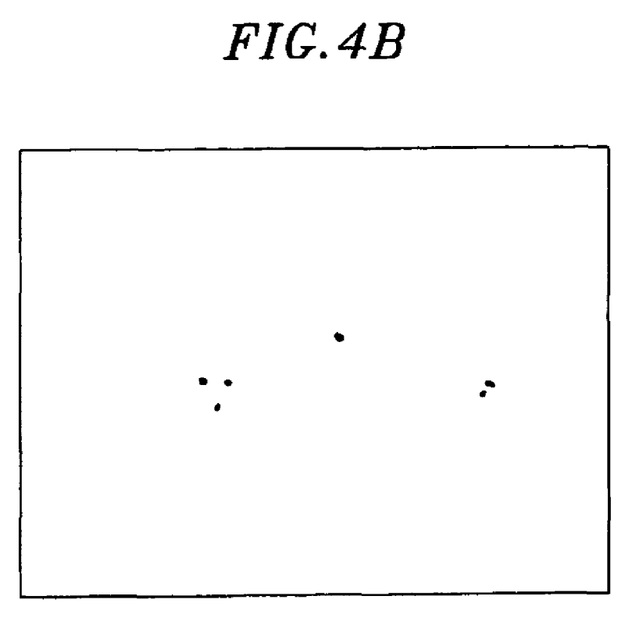

FIGS. 4A and 4B illustrate a procedure of clustering center coordinates of faces and coordinates of eyes of the facial records performed in the facial image detector shown in FIG. 1.

As described with reference to FIG. 3, in the facial image detector 106, when the face candidates and the eye candidates are extracted, the center coordinates of faces and the center coordinates of eyes are clustered in the respective facial records to classify the same into face candidates and eye candidates. After the classification, an average coordinate of the center coordinates of faces is obtained from the respective face candidates.

The facial records far from the average center coordinate over a preset distance are eliminated by using the obtained average center coordinate of faces. An average center coordinate of faces of the remaining face candidates is obtained again and is calculated as the center coordinates of faces. Face size information such as width and length of a face is calculated by averaging the remaining facial records. Then, the center coordinates of eyes are calculated with the remaining facial records. Like the above-described method, the center coordinate of eyes is calculated by which an average center coordinate of respective eyes is obtained from the eye candidates, by which eye candidates far from the average center coordinate over a preset distance are eliminated, and by which an average center coordinate of the remaining eye candidates is set to a final center coordinate of the remaining eye candidates.

The above-described procedures are advantageous in that the correct centers of faces and the correct positions of eyes are likely to be gathered to one point because faces and eyes are detected from the facial records classified by face and eye classifiers while reducing images. Therefore, an average excluding error range is calculated to minimize erroneous detection.

Figure 4C:
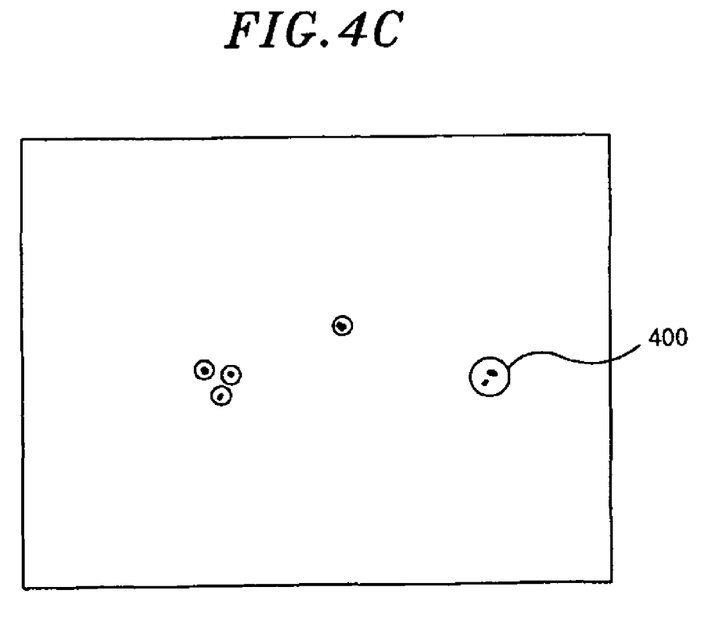
Figure 4D:
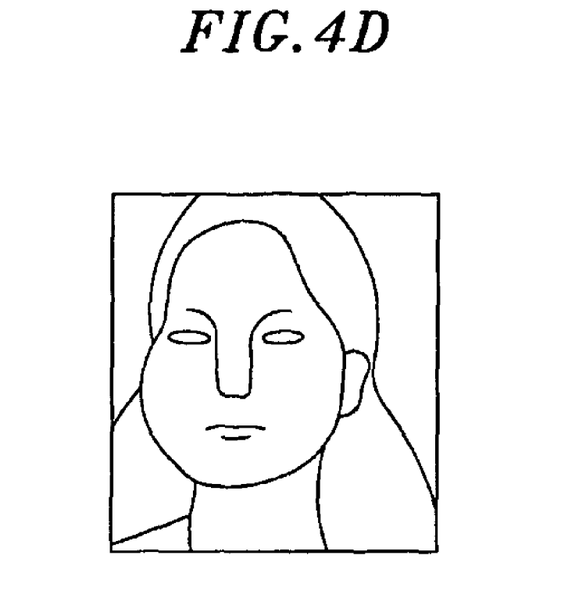
Figure 4E:
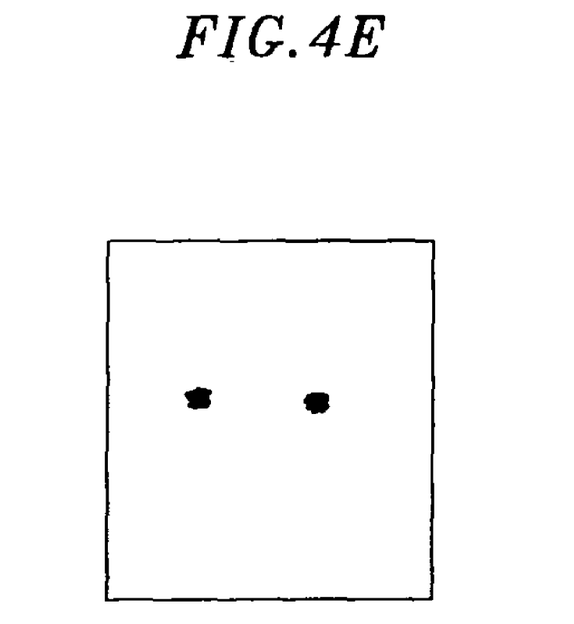

FIG. 4A is a view depicting face candidates into an input image and FIG. 4B is a view illustrating center coordinates of facial records. FIG. 4C is a view illustrating center coordinates of faces classified into face candidates through clustering classification. As shown in FIG. 4C, the respective face candidates are inside circles 400. FIG. 4D is a view illustrating a detected facial image and FIG. 4E is a view illustrating eye candidates of the detected facial image.

Figure 5A:
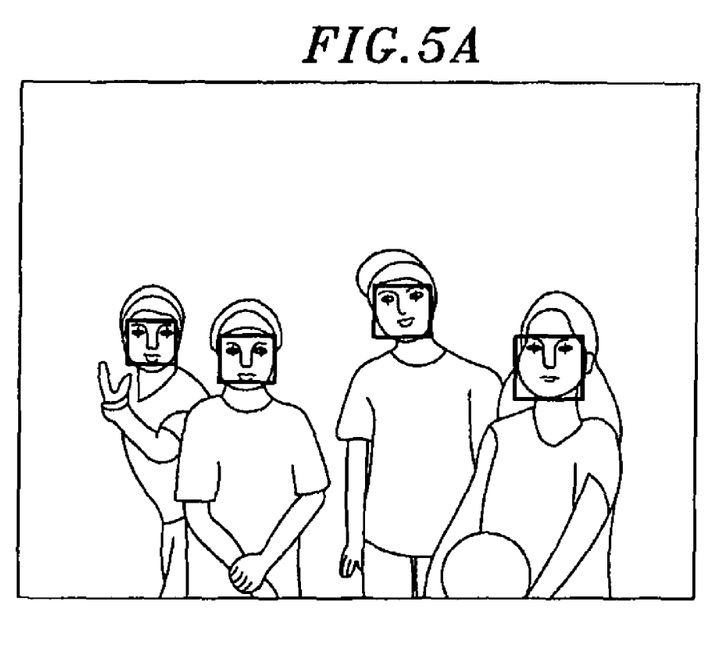
FIGS. 5A and 5B are exemplary views showing resultant detected facial images in accordance with the embodiment of the present invention.
Figure 5B:
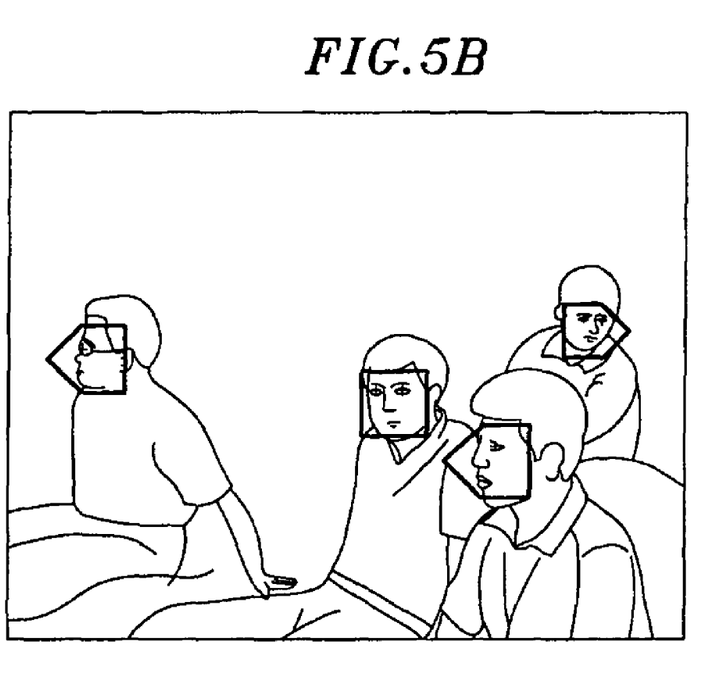

FIGS. 5A and 5B illustrates results finally obtained by the above-mentioned procedures applied to the input image. Particularly, the detected face regions are illustrated as rectangles as shown in FIG. 5A and the coordinates of eyes are depicted by cross-shaped lines as shown in FIG. 5B.

While the invention has been shown and described with respect to the embodiment, it will be understood by those skilled in the art that various changes and modifications may be made without departing from the scope of the invention as defined in the following claims.

What is claimed is:

1. A computer-implemented method of detecting a facial image, comprising:
   with a computing device:
   pre-processing an image;
   detecting a face region from the pre-processed image to create facial records of the detected face region; and
   detecting the facial image by creating coordinates of the face and eyes in the input image by using the facial records, the detecting of the facial image:
   classifying the facial records into face candidates and eye candidates through clustering,
   calculating an average coordinate of center coordinates of the face candidates and eliminating facial records far from the average coordinate over a preset distance, and
   calculating an average coordinate of center coordinates of remaining face candidates after the elimination to calculate a final center coordinate of a face.

2. The method of claim 1, wherein said pre-processing includes:
   converting the input image into a black-and-white image; and
   performing compensation of illumination with respect to the converted black-and-white image to produce the pre-processed image.

3. The method of claim 2, wherein, said performing compensation of illumination includes performing histogram equalization or self quotient image with respect to the black-and-white image.

4. The method of claim 1, wherein said detecting a face region from the pre-processed image to create facial records of the detected face region includes:
   creating n×n pixel-sized windows with respect to the pre-processed image;
   detecting a face region from the respective windows;
   detecting coordinates of eyes from the face regions;
   normalizing the respective windows into a preset size based on the detected coordinates of eyes;
   performing face verification in the normalized windows; and
   creating the facial records on faces in the windows to which the face verification is performed.

5. The method of claim 4, wherein the face verification is performed by using an adaptive boosting or information on relative brightness differences of pixels in images of the windows.

6. The method of claim 4, wherein each of the facial records includes a center coordinate and a size of face and the coordinates of eyes which are positioned in the image of the window to which the face verification is performed.

7. The method of claim 4, further comprising reducing the pre-processed input image by a preset magnification before said creating the n×n pixel-sized windows.

8. The method of claim 1, wherein said detecting the facial image includes:
   calculating an average coordinate of eye coordinates of the eye candidates and eliminating eye candidates far from the average coordinate over a preset distance; and
   calculating an average coordinate of eye coordinates of remaining eye candidates after the elimination to calculate final coordinate of eyes.

9. The method of claim 8, wherein a size of face is calculated by averaging face size information in the facial records of the face candidates used in calculating the final center coordinate of the face.

10. The method of claim 8, wherein the clustering is one of a self organizing map and K-means clustering.

11. An apparatus for detecting a face, comprising:
   an image input unit for receiving an input image;
   a pre-processor for performing pre-processing to the input image;
   a facial record creating unit for creating the n×n pixel-sized windows with respect to the pre-processed image, detecting face regions from the windows and creating facial records with respect to the detected face regions; and
   a face detector for detecting a face by creating center coordinate of face and coordinates of eyes in the input image by using the facial records, the detecting of the face:
   classifying the facial records into face candidates and eye candidates through clustering,
   calculating an average coordinate of center coordinates of the face candidates and eliminating facial records far from the average coordinate over a preset distance, and calculating an average coordinate of center coordinates of remaining face candidates after the elimination to calculate a final center coordinate of a face.

12. The face detecting apparatus of claim 11, wherein the pre-processing is made by converting the input image into a black-and-white image and compensating illumination by performing histogram equalization or self quotient image to the converted black-and-white image.

13. The face detecting apparatus of claim 11, wherein the pre-processed input image is reduced by a preset magnification before creating the n×n pixel-sized windows.

14. The face detecting apparatus of claim 13, wherein the facial records are created by detecting coordinates of faces and eyes from the respective windows, performing normalization of the respective windows by a preset size based on the detected coordinates of eyes, performing face verification of the normalized windows to thereby create the facial records of faces in the windows.

15. The face detecting apparatus of claim 14, wherein the face verification is made by using an adaptive boosting or information on relative brightness differences of pixels in images of the windows.

16. The face detecting apparatus of claim 15, wherein each of the facial records includes a center coordinate and a size of face and the coordinates of eyes which are positioned in the image of the window to which the face verification is performed.

17. The face detecting apparatus of claim 11, wherein the coordinate of the eyes are obtained by calculating the average coordinate of eye coordinates of the eye candidates, eliminating eye candidates far from the average coordinate over a preset distance, and calculating an average coordinate of eye coordinates of remaining eye candidates as the coordinates of eyes.

18. The face detecting apparatus of claim 17, wherein the size of the detected face is obtained by extracting face size information from the facial records used in calculating the center coordinate of the face and calculating an average of face size information.

* * * * *